United States Patent
Carr et al.

(10) Patent No.: US 7,140,904 B2
(45) Date of Patent: Nov. 28, 2006

(54) METHOD AND APPARATUS FOR SECURING A MODULAR COMPONENT IN A CHASSIS

(75) Inventors: Daniel Carr, Round Rock, TX (US); Lisa Sura, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/069,360

(22) Filed: Mar. 1, 2005

(65) Prior Publication Data
US 2006/0199419 A1 Sep. 7, 2006

(51) Int. Cl.
*H01R 13/62* (2006.01)

(52) U.S. Cl. .................................. 439/372

(58) Field of Classification Search ............ 439/372, 439/328, 489, 357
See application file for complete search history.

(56) References Cited
U.S. PATENT DOCUMENTS

| | | | |
|---|---|---|---|
| 4,141,616 A | * | 2/1979 | Gottlieb ............... 439/263 |
| 5,717,571 A | | 2/1998 | Helot |
| 6,469,900 B1 | | 10/2002 | Cheng |
| 6,643,139 B1 | * | 11/2003 | Tien ..................... 361/727 |
| 6,752,641 B1 | * | 6/2004 | Puri et al. ............. 439/157 |
| 6,785,141 B1 | | 8/2004 | Fang |

* cited by examiner

*Primary Examiner*—Tulsidas C. Patel
*Assistant Examiner*—Phuongchi Nguyen
(74) *Attorney, Agent, or Firm*—Haynes and Boone, LLP

(57) ABSTRACT

A modular component securing apparatus includes a chassis, a securing member moveably coupled to the chassis and including an activation surface, a biasing member coupled to the securing member and operable to bias the securing member into a deactivated position, a component detection member coupled to the securing member and operable to move the securing member relative to the chassis and into an activated position in response to the component detection member being engaged by a modular component, and an activation member including an activator surface. In response to the securing member being moved into the activated position, the activator surface may engage the activation surface in order to move the securing member relative to the chassis and into a securing position. The securing member may be moved into the securing position only when a modular component is positioned in the chassis.

19 Claims, 7 Drawing Sheets

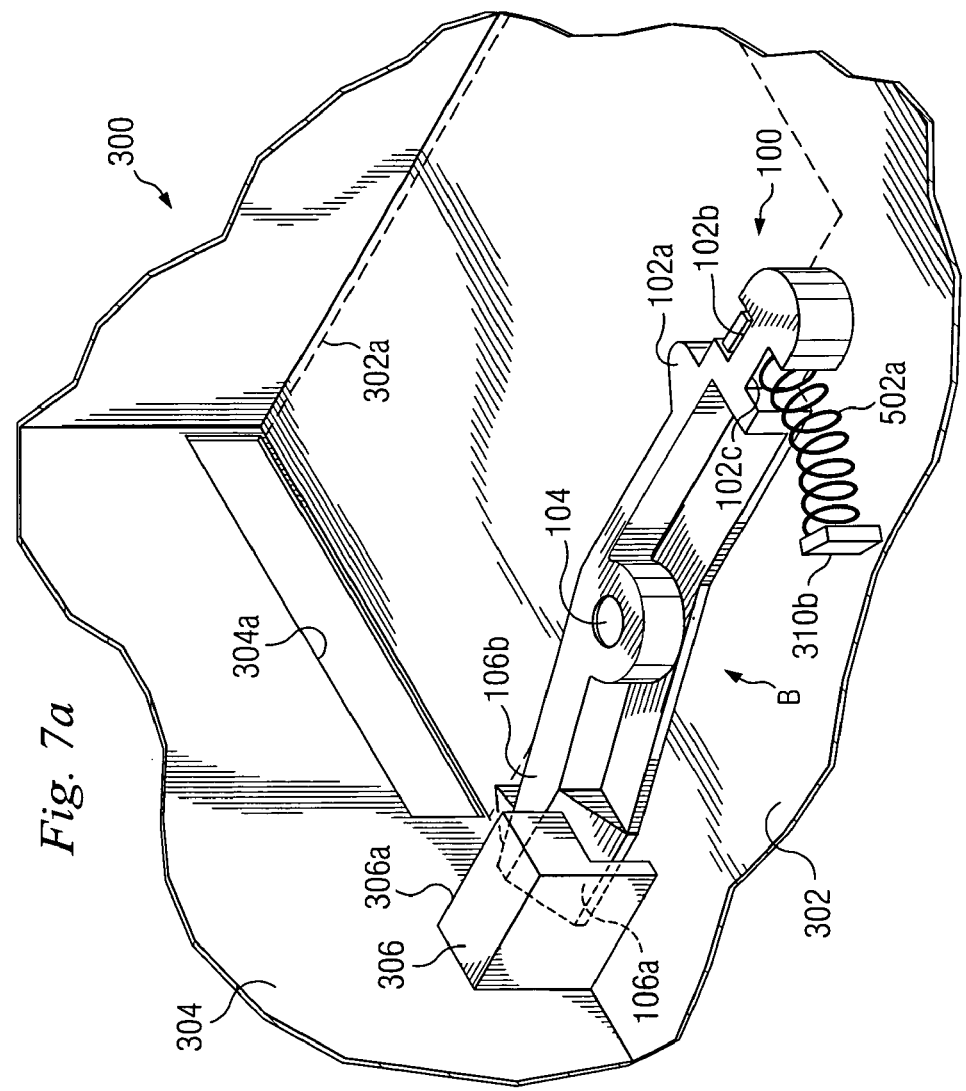
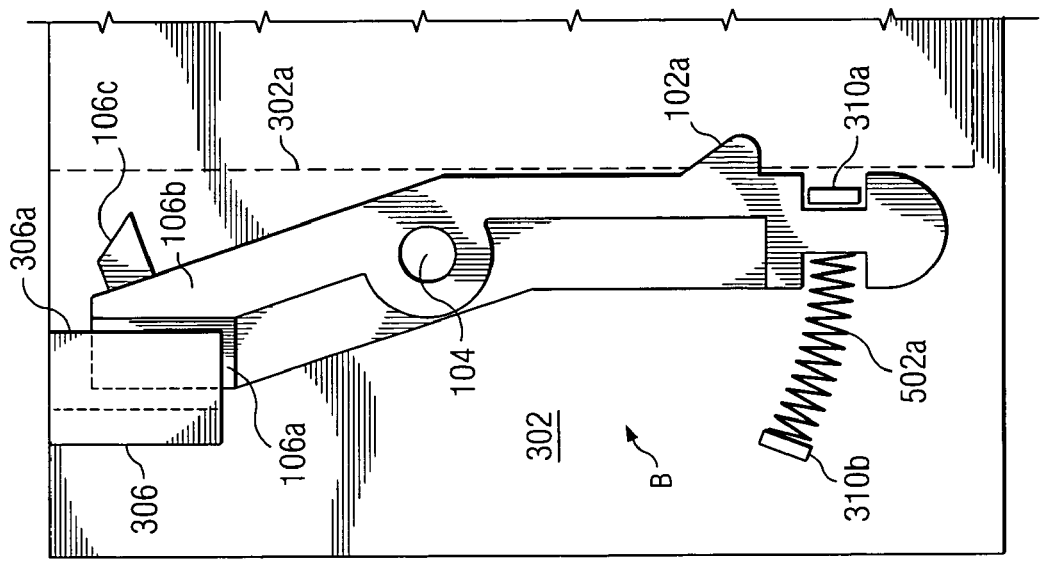
Fig. 7a
Fig. 7b

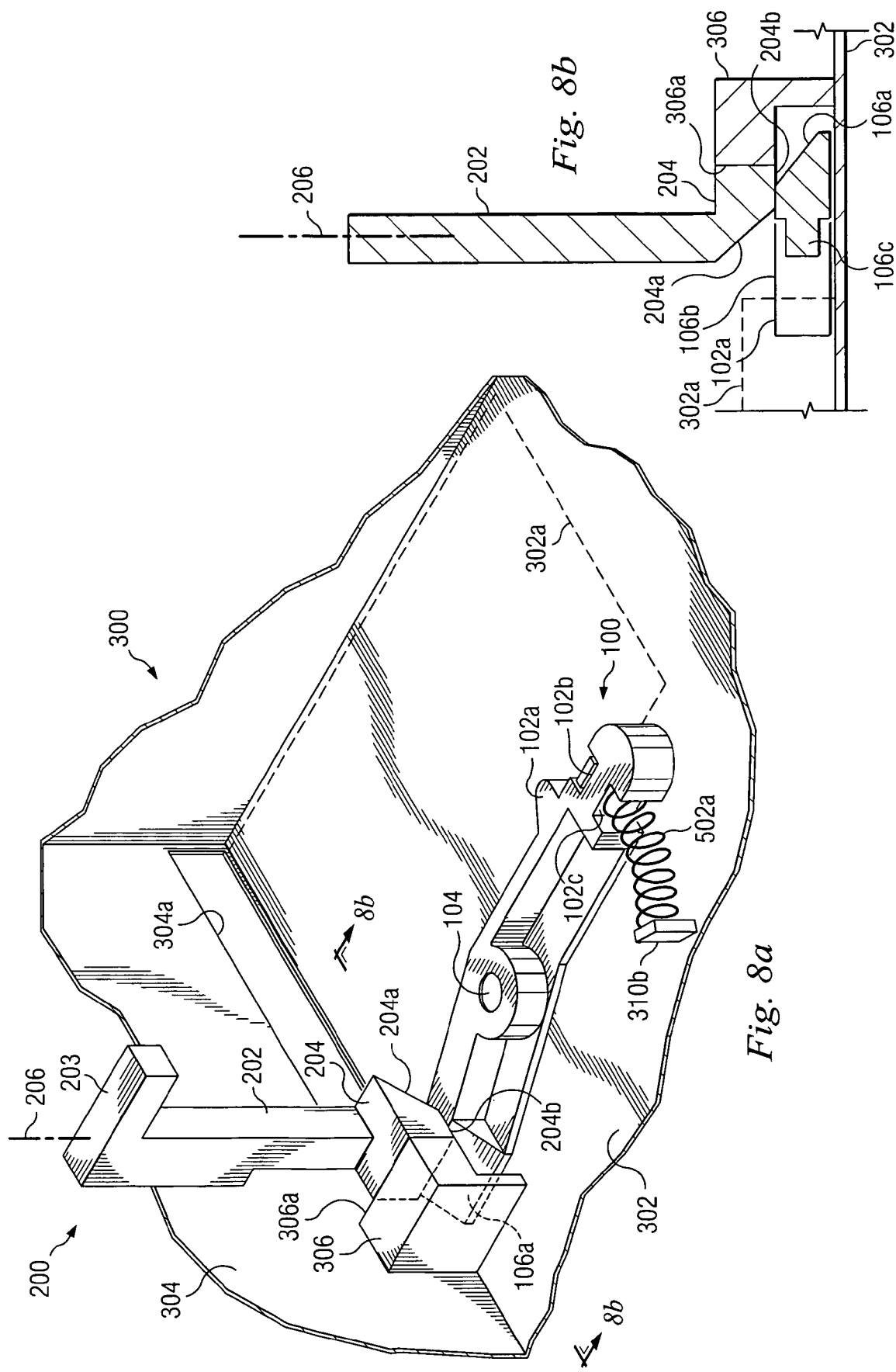

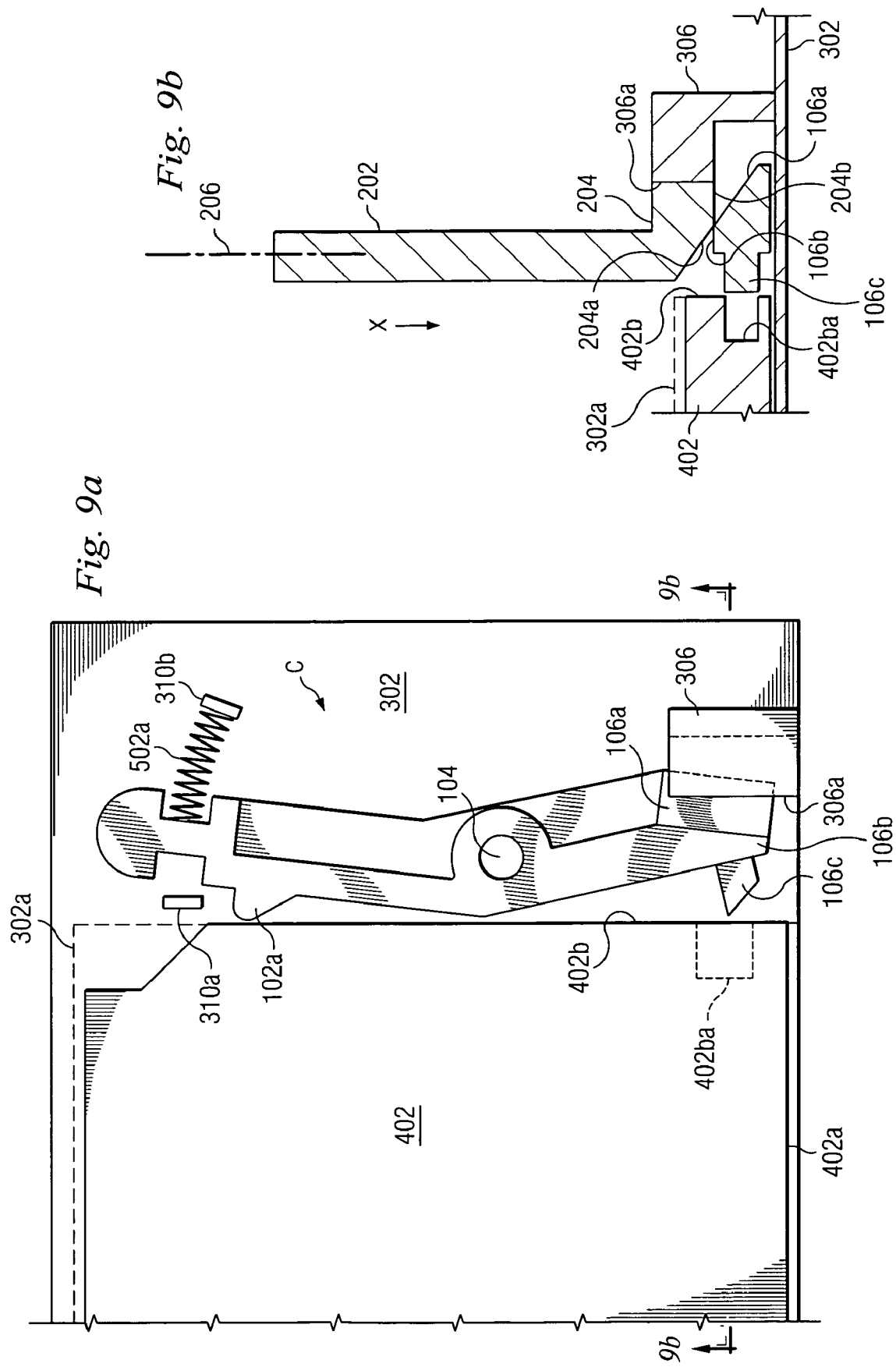

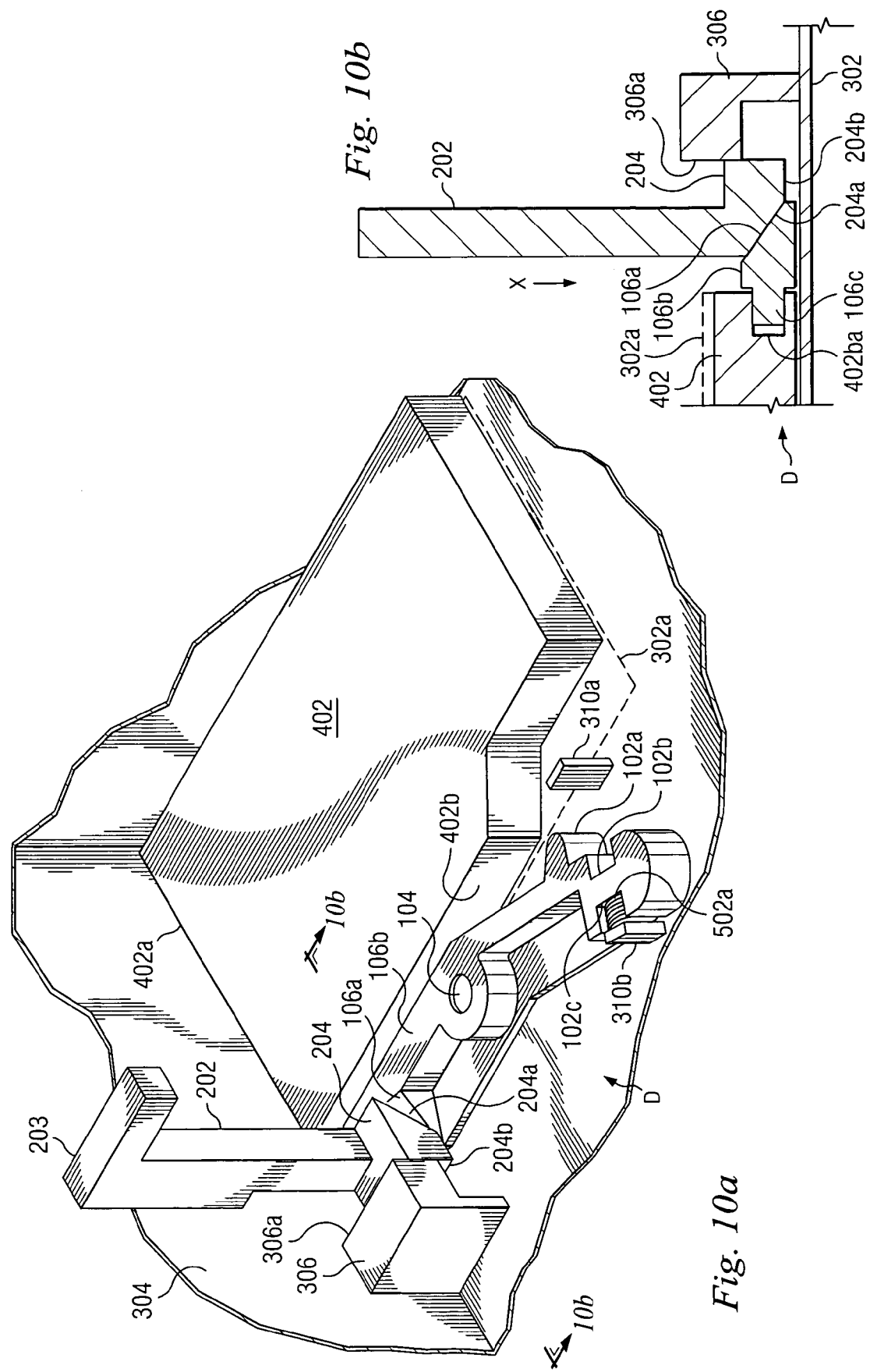

METHOD AND APPARATUS FOR SECURING A MODULAR COMPONENT IN A CHASSIS

BACKGROUND

The present disclosure relates generally to information handling systems, and more particularly to a method and apparatus for securing a modular component in a chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modular components such as, for example, floppy disk drives, optical drives, storages devices, and a variety of other equivalent components known in the art, or often used with information handling systems. These modular components may be coupled to and removed from the information handling system as a users needs require.

It is desirable to provide for the securing of these modular components in the information handling system chassis. However, conventional securing devices may become be activated without the modular component present in the chassis, which can result in damage to the modular component, the chassis, and/or the securing mechanism. Additionally, convention devices tend to exist at least partially external to the chassis, which raises security issues.

Accordingly, it would be desirable to provide a method and apparatus for securing a modular component in a chassis absent the disadvantages found in the prior methods discussed above.

SUMMARY

According to one embodiment, a modular component securing apparatus is provided that includes a chassis, a securing member moveably coupled to the chassis and including an activation surface, a biasing member coupled to the securing member and operable to bias the securing member into a deactivated position, a component detection member coupled to the securing member and operable to move the securing member relative to the chassis and into an activated position in response to the component detection member being engaged by a modular component, and an activation member including an activator surface, whereby in response to the securing member being moved into the activated position, the activator surface may engage the activation surface in order to move the securing member relative to the chassis and into a securing position.

A principal advantage of this embodiment is that the securing member cannot be moved into the securing position without a modular component being positioned in the modular component passageway. Furthermore, the apparatus may exist internal to the chassis.

BRIEF DESCRIPTION OF THE DRAWINGS

FIG. 2b is a top view illustrating an embodiment of the securing member of FIG. 2a.

FIG. 7a is a perspective view illustrating an embodiment of the securing member of FIG. 2a coupled to the chassis of FIG. 4.

FIG. 7b is a top view illustrating the securing member and chassis of FIG. 7a.

FIG. 8a is a perspective view illustrating the securing member and chassis of FIG. 7a with the activation member of FIG. 3 positioned adjacent the securing member.

FIG. 8b is a cross sectional view illustrating the securing member, chassis, and activation member of FIG. 8a.

FIG. 9a is a top view illustrating the modular component of FIG. 5 positioned in the chassis of FIG. 8a.

FIG. 9b is a cross sectional view illustrating the modular component and chassis of FIG. 9a.

FIG. 10a is a perspective view illustrating the securing member, chassis, and activation member of FIG. 8a with the securing member securing the modular component in the chassis.

FIG. 10b is a cross sectional view illustrating the securing member, chassis, activation member, and modular component of FIG. 10a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
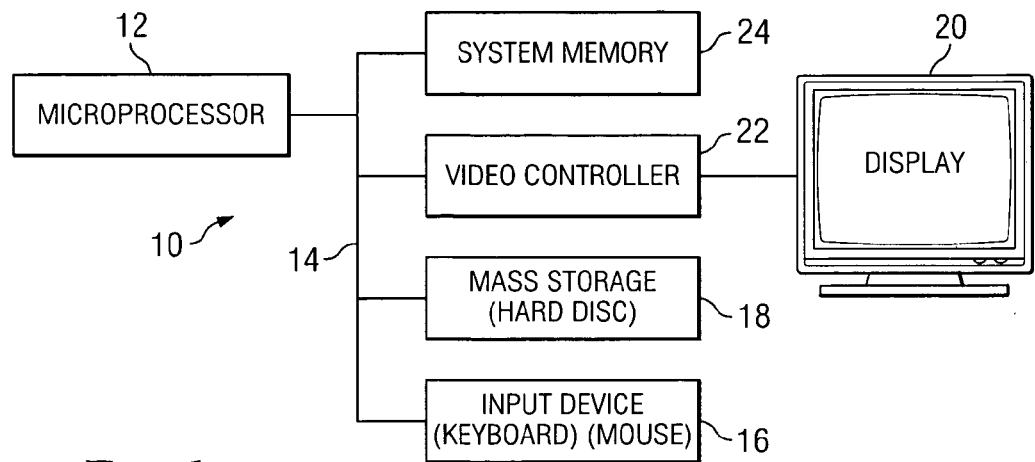
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2A:
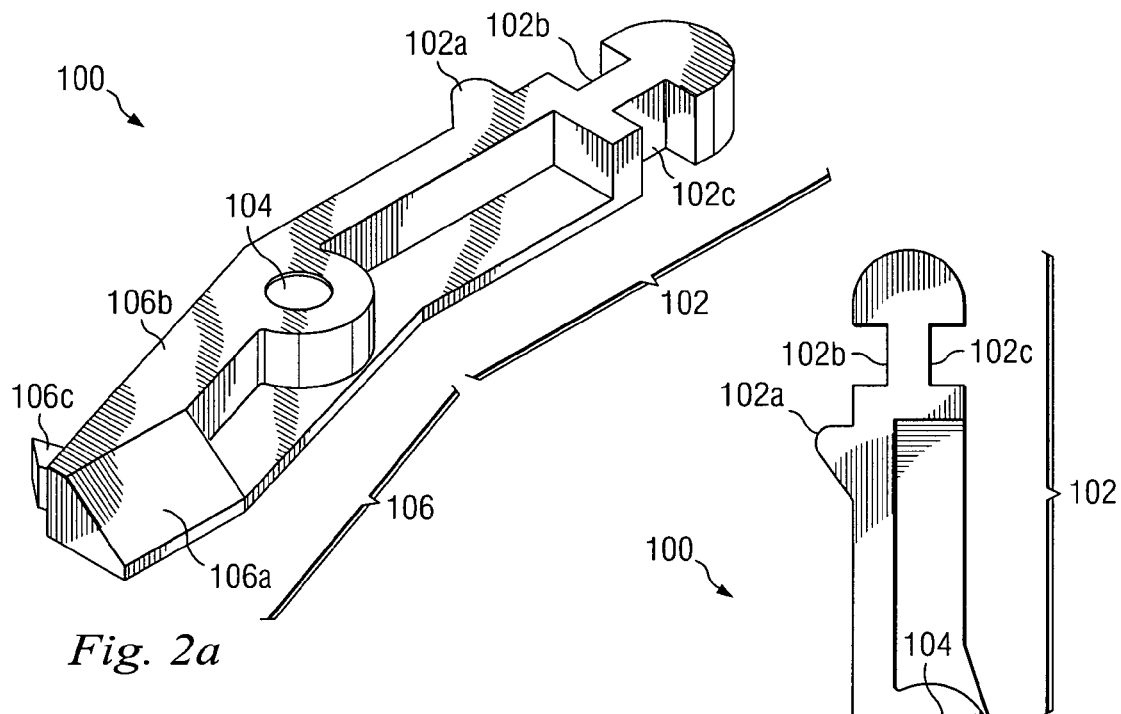
FIG. 2a is a perspective view illustrating an embodiment of a securing member.
Figure 2B:
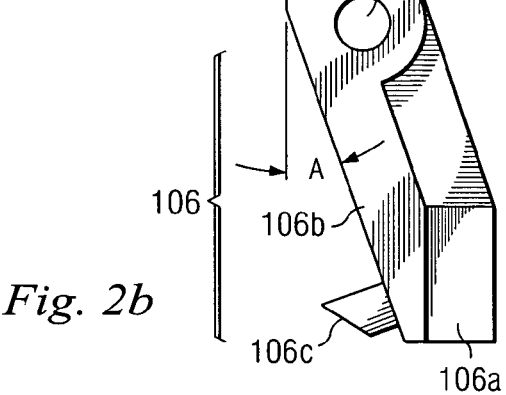

Referring now to FIGS. 2a and 2b, a securing member 100 is illustrated. Securing member 100 includes a component detecting section 102 including a component detecting member 102a extending out of the side of the component detecting section 102. A stop channel 102b and a biasing channel 102c are defined by the component detecting section 102 and positioned on opposite sides of the component detecting section 102 and adjacent the distal end of the component detecting section 102. A pivot coupling 104 is positioned adjacent the component detecting section 102. A component securing section 106 extends from the pivot coupling 104 at an angle A from the component detecting section 102. An inclined activation surface 106a is positioned adjacent a distal end of the component securing section 106. A substantially level deactivation surface 106b is included adjacent the inclined activation surface 106a. A locking tooth 106c extends from a side of the component securing section 106 adjacent the deactivation surface 106b.

Figure 3:
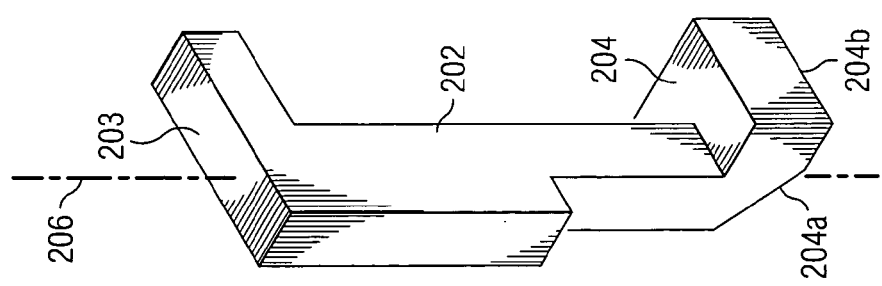
FIG. 3 is a perspective view illustrating an embodiment of an activation member.

Referring now to FIG. 3, an activation member 200 is illustrated. Activation member 200 includes an elongated base 202 including a handle 203 positioned on its distal end. A activator section 204 is positioned on the end of the elongated base 202 opposite the handle and includes an inclined activator surface 204a. A substantially level deactivator surface 204b is positioned adjacent the inclined activator surface 204a. Activation member 200 includes an axis 206 along its length.

Figure 4:
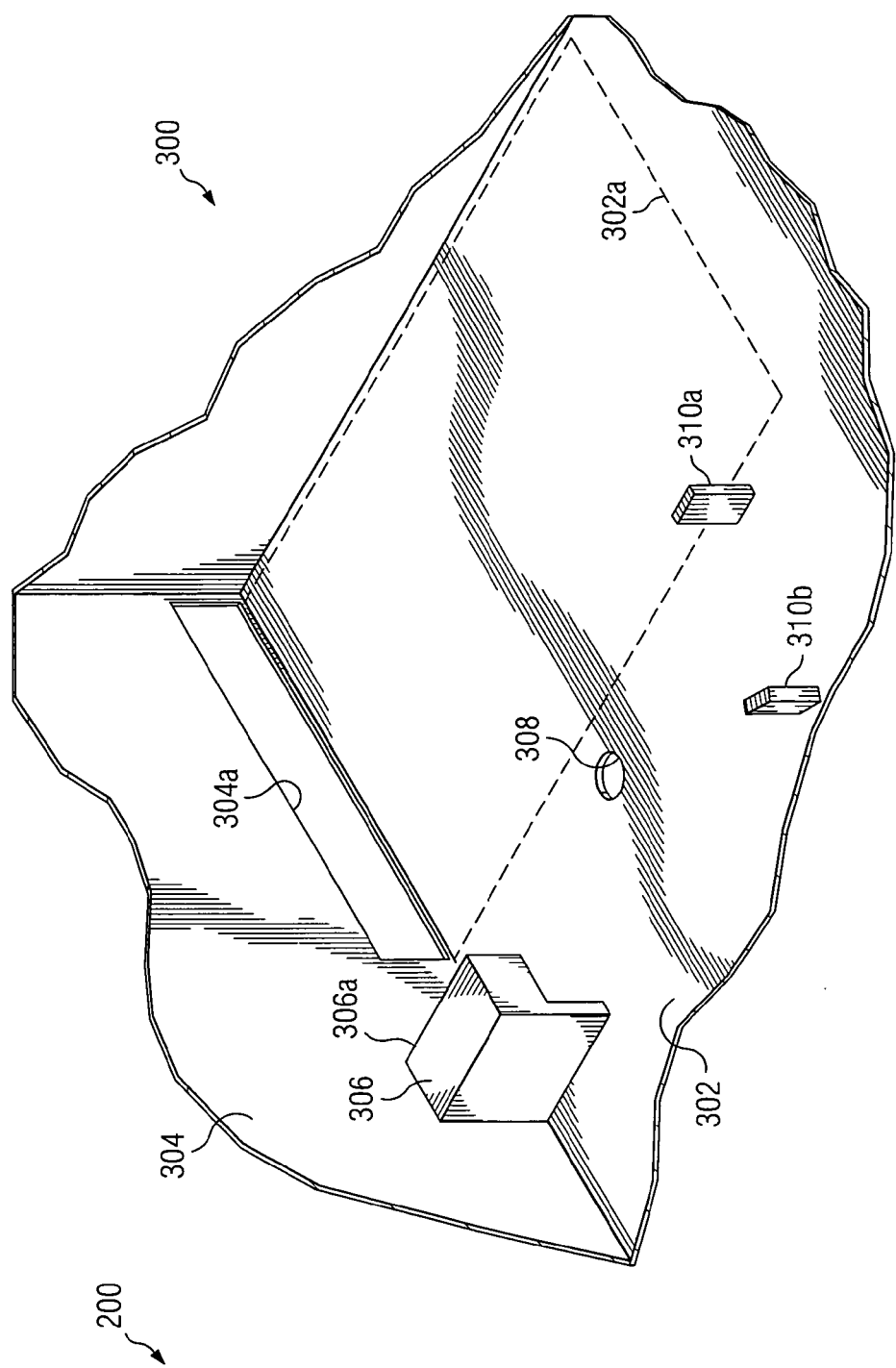
FIG. 4 is a perspective view illustrating an embodiment of a chassis.

Referring now to FIG. 4, a chassis 300 is illustrated. Chassis 300 includes a base 302 and wall 304 extending substantially perpendicularly from the base 302. Wall 304 defines a modular component entrance 304a partially along its length. Base 302 defines a modular component passageway 302a which has a width substantially equal to the width of the modular component entrance 304a. A bracing member 306 extends from the base 302 and the wall 304 adjacent the modular component passageway 302a and includes a bracing surface 306a. A pivot point 308 is positioned adjacent the modular component passageway 302a. A stop surface 310a and a biasing surface 310b extend from the base 302 and are positioned in a spaced apart relationship adjacent the modular component passageway 302a.

Figure 5:
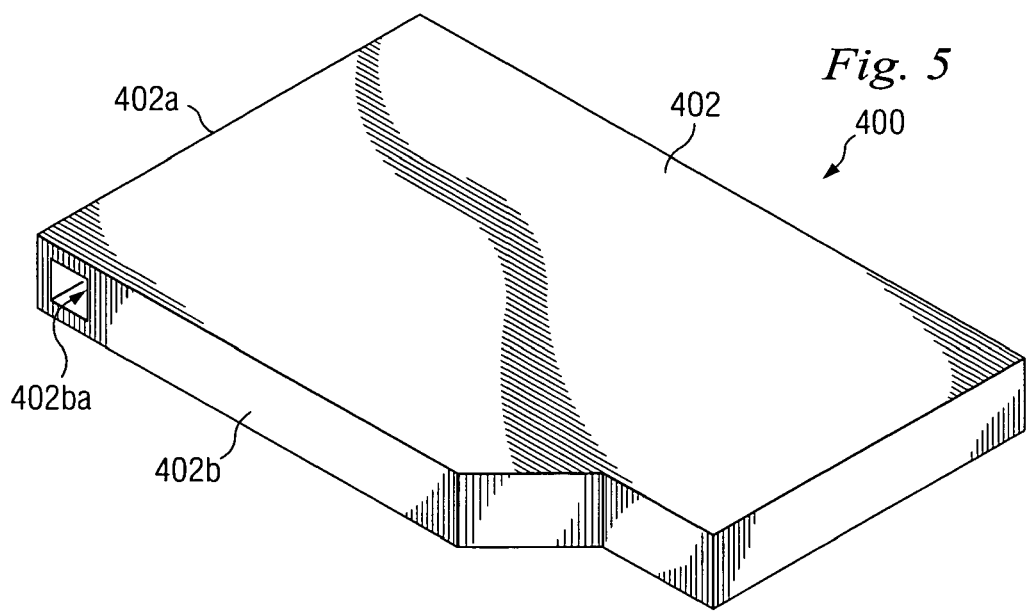
FIG. 5 is a rear perspective view illustrating an embodiment of a modular component.

Referring now to FIG. 5, a modular component 400 is illustrated. Modular component 400 includes a base 402 having a front 402a and a side 402b positioned substantially perpendicularly to the front 402a. A lock channel 402ba is defined by the side 402b of modular component 400 and is positioned adjacent the front 402a of the modular component 400.

Referring now to FIGS. 4, 6, 7a, and 7b, a method 500 for securing a modular component is illustrated. The method 500 begins at step 502 where the securing member 100 is pivotally coupled to the chassis 300 adjacent the modular component passageway 302a by coupling pivot coupling 104 on securing member 100 to pivot point 308 on chassis 300. A biasing spring 502a is coupled to the biasing surface 310b on chassis 300 and positioned in biasing channel 102c and on securing member 100 and in contact with securing member 100. With biasing spring 502a coupled to the chassis 300 and the securing member 100, the securing member 100 is biased into a deactivated position B with stop surface 310a engaging the securing member 100 in stop channel 102b. In deactivated position B, the component detecting member 102a on securing member 100 is positioned in the modular component passageway 302a, with the inclined activation surface 106a on securing member 100 positioned partially underneath a portion of bracing member 306.

Figure 6:
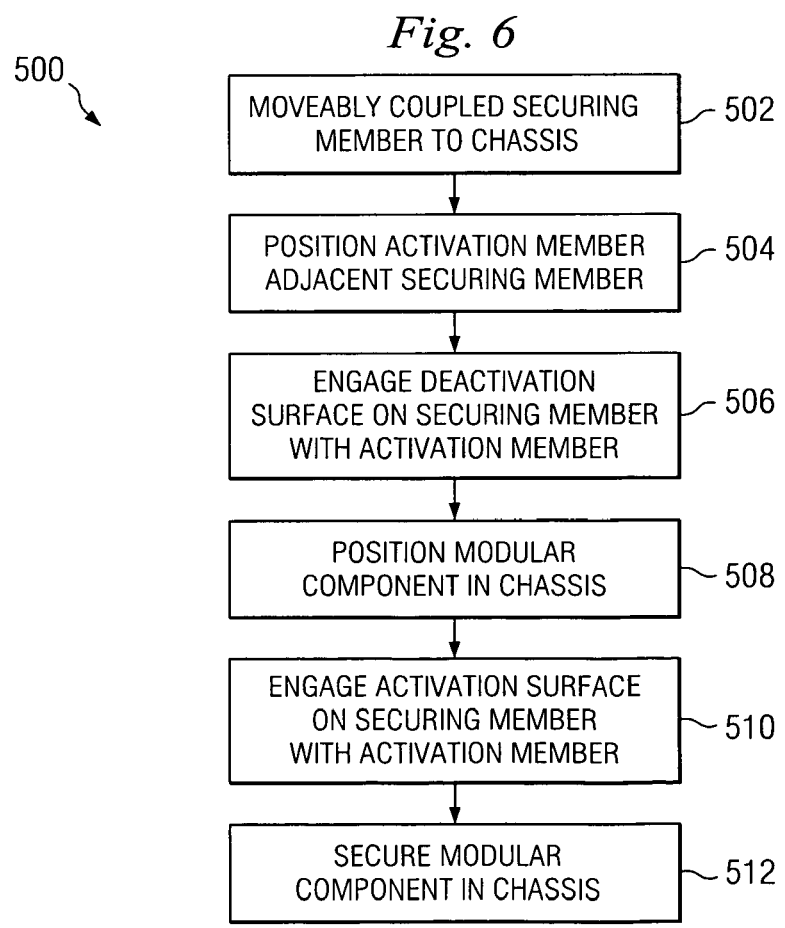
FIG. 6 is a flow chart illustrating an embodiment of a method for securing a modular component in a chassis.

Referring now to FIGS. 6, 8a, and 8b, the method 500 proceeds to step 504 where the activation member 200 is positioned adjacent the securing member 100. The activation member 200 is coupled to the chassis 300 such that the activation member 200 is allowed to move vertically along its axis 206 but not perpendicularly to the axis 206. Activator section 204 on activation member 200 engages the bracing surface 306a on bracing member 306, further restricting the horizontal movement of activation member 200. The method 500 then proceeds to step 506 where the deactivator surface 204b on activation member 200 is engaged with deactivation surface 106b on securing member 100. With deactivator surface 204b on activation member 200 engaging deactivation surface 106b on securing ember 100, activation member 200 is restricted from moving vertically along its axis 206 and from moving the securing member 100.

Referring now to FIGS. 2b, 6, 7b, 8a, 9a, and 9b, the method 500 proceeds to step 508 where the modular component 400 is positioned in the chassis 300. Modular component 400 enters chassis 300 and modular component passageway 302a through modular component entrance 304a. As modular component 400 moves through modular component passageway 302a, side 402b of modular component 400 engages component detecting member 102a. In response to the engagement of modular component 400 and component detecting member 102a, the securing member 200 is rotated clockwise, as illustrated in FIGS. 7b and 9a, about pivot coupling 104 an into an activated position C. The angle A between the component securing section 106 and the component detecting section 104 on securing member 100 is such that, upon pivoting the securing member 100 by engaging the component detecting member 102a, the locking tooth 106c does not enter the lock channel 402ba on modular component 400. Furthermore, upon pivoting the securing member 100, deactivator surface 204b on activation member 200 disengages deactivation surface 106b on securing member 100 and activator surface 204a on activation member 200 is positioned to engage activation surface 106b on securing member 100.

Referring now to FIGS. 6, 9a, 9b, 10a, and 10b, the method 500 proceeds to step 510 where the activation surface 106a on securing member 100 is engaged by the activator surface 204a on activation member 200. Handle 203 on activation member 200 may be used to move the activation member 200 vertically along its axis 206 in a direction X. Movement of the activation member 200 in direction X engages the activation surface 106a on securing member 100 with the activator surface 204a on activation member 200 and causes the securing member 100 to rotate clockwise about pivot coupling 104 and into a locking position D. In locking position D, locking tooth 106c on securing member 100 is positioned in locking channel 402ba, with activation member 200 holding securing member 100 and locking tooth 106c in position due to the engagement of activation surface 106a and activator surface 204a. The method 500 then proceeds to step 512 where the modular component 400 is secured in the chassis 300. The activation member 200 is locked in place using conventional means known in the art, holding the locking tooth 106c in the locking channel 402ba. Bracing member 306 provides support for activation member 200 to prevent locking tooth 106c on securing member 100 from being removed from locking channel 402ba on modular component 400. The modular component 400 may be removed from the chassis 300 by unlocking the activation member 200 and moving it vertically along its axis 206 in a direction opposite the direction X. Moving the activation member 200 in a direction opposite the direction X allows the biasing spring 502a to rotate the securing member 100 counter-clockwise about pivot coupling 104 and removes the locking tooth 106c from the locking channel 402ba on modular component 400.

It is understood that variations may be made in the foregoing without departing from the scope of the disclosed embodiments. Furthermore, the elements and teachings of the various illustrative embodiments may be combined in whole or in part with some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modular component securing apparatus comprising:
   a chassis;
   a securing member moveably coupled to the chassis and including an activation surface;
   a biasing member coupled to the securing member and operable to bias the securing member into a deactivated position;
   a component detection member coupled to the securing member and operable to move the securing member relative to the chassis and into an activated position in response to the component detection member being engaged by a modular component; and
   an activation member including an activator surface, whereby in response to the securing member being moved into the activated position, the activator surface of the activation member may engage the activation surface of the securing member to move the securing member relative to the chassis and into a securing position, whereby the activated position is separate and distinct from the securing position such that the securing member must be in the activated position in order for the activation member to move the securing member into the securing position.

2. The apparatus of claim 1 wherein the securing member is pivotally coupled to the chassis.

3. The apparatus of claim 1 wherein the activation surface includes an inclined surface.

4. The apparatus of claim 1 wherein the component detection member extends from a side of the securing member and is operable to pivot the securing member relative to the chassis and into the activated position in response to the component detection member being engaged by a modular component.

5. The apparatus of claim 1 wherein the activator surface includes an inclined surface.

6. The apparatus of claim 1 further comprising:
   a deactivation surface positioned adjacent the activation surface on the securing member, whereby the activation member engages the deactivation surface when the securing member is in the deactivated position.

7. The apparatus of claim 1 further comprising:
   a bracing member mounted to the chassis and positioned adjacent the activation member.

8. An information handling system comprising:
   a chassis defining a modular component passageway;
   a securing member moveably coupled to the chassis, including an activation surface, and positioned adjacent the modular component passageway;
   a biasing member coupled to the securing member and operable to bias the securing member into a deactivated position;
   a component detection member coupled to the securing member and positioned in the modular component passageway when the securing member is in the deactivated position, the component detection member operable to move the securing member relative to the chassis and into an activated position in response to the component detection member being engaged by a modular component; and
   an activation member including an activator surface, whereby in response to the securing member being moved into the activated position, the activator surface of the activation member may engage the activation surface of the securing member to move the securing member relative to the chassis and into a securing position, whereby the activated position is separate and distinct from the securing position such that the securing member must be in the activated position in order for the activation member to move the securing member into the securing position.

9. The system of claim 8 wherein the securing member is pivotally coupled to the chassis.

10. The system of claim 8 wherein the activation surface includes an inclined surface.

11. The system of claim 8 wherein the component detection member extends from a side of the securing member and into the modular component passageway, whereby the component detection member is operable to pivot the securing member relative to the chassis and into the activated position in response to the component detection member being engaged by a modular component.

12. The system of claim 8 wherein the activator surface includes an inclined surface.

13. The system of claim 8 further comprising:
   a deactivation surface positioned adjacent the activation surface on the securing member, whereby the activation member engages the deactivation surface when the securing member is in the deactivated position.

14. The system of claim 8 further comprising:
a bracing member mounted to the chassis and positioned adjacent the activation member.

15. The system of claim 8 further comprising:
a modular component positioning in the modular component passageway and engaging the component detection member.

16. The system of claim 15 wherein the securing member may be moved into the securing position only when the modular component is positioned in the modular component passageway.

17. A method for securing a modular component in an information handling system comprising:
providing a chassis including a modular component passageway;
moveably coupling a securing member to the chassis, the securing member including an activation surface and a deactivation surface adjacent the activation surface;
positioning an activation member adjacent the securing member, the activation member including an activator surface;
engaging the deactivation surface with the activation member when the securing member is in a deactivated position;
positioning a modular component in the modular component passageway, whereby the positioning a modular component in the modular component passageway moves the securing member to an activated position;
engaging the activation surface with the activator surface on the activation member; and
securing the modular component in the chassis by moving the securing member to a securing position, whereby the activated position is separate and distinct from the securing position such that the securing member must be in the activated position in order for the activation member to move the securing member into the securing position.

18. The method of claim 17 further comprising:
coupling a component detection member to the securing member, whereby the modular component engages the component detection member and moves the securing member to an activated position in response to being positioned in the modular component passageway.

19. The method of claim 17 further comprising;
locking the activation member in position with the activator surface of the activation member engaging the activation surface of the securing member.

* * * * *